United States Patent [19]

Kosaka

[11] 3,843,573

[45] Oct. 22, 1974

[54] NOISE REDUCTION DEVICE OF A TAPE RECORDER

[75] Inventor: Tomoaki Kosaka, Tokorozawa, Japan

[73] Assignee: Pioneer Electronic Corporation, Tokyo, Japan

[22] Filed: Aug. 24, 1972

[21] Appl. No.: 283,468

[30] Foreign Application Priority Data

Aug. 30, 1971 Japan ........................ 46-78139

[52] U.S. Cl. ........................ 360/25, 360/67

[51] Int. Cl. ...... G11b 5/44, G11b 5/02, G11b 27/30

[58] Field of Search ...... 179/100.2 K, 100.2 S, 179/100.2 MD, 100.1 F, 100.2 B; 340/174.1 B, 174.1 K; 178/6.6 A; 360/25, 67, 22, 27

[56] References Cited

UNITED STATES PATENTS

| | | | |
|---|---|---|---|
| 2,351,010 | 6/1944 | Camras | 179/100.2 K |
| 2,791,640 | 5/1957 | Wolfe | 179/100.2 K |
| 3,381,083 | 4/1968 | Jensen et al. | 179/100.2 K |
| 3,604,859 | 9/1971 | Ban | 179/100.1 F |
| 3,621,151 | 11/1971 | Wood | 179/100.2 K |
| 3,631,365 | 12/1971 | Dolby | 179/100.2 K |
| 3,657,489 | 4/1972 | Clark, Jr. | 179/100.2 S |

*Primary Examiner*—Alfred H. Eddleman
*Attorney, Agent, or Firm*—Sughrue, Rothwell, Mion, Zinn & Macpeak

[57] ABSTRACT

A method and apparatus for reducing high frequency noise in a reproduced magnetically recorded signal. The recorded signal is reproduced by first and second magnetic heads. The frequency range of the second head is limited to a predetermined range and the output of the head is used to control a bypass circuit connected to the output of the first head. When no signal is reproduced by said second head the high frequency output of the first head is shunted to ground. In this manner, high frequency noise which is not within said predetermined range is not reproduced by said second head and therefore the noise reproduced by the first head is shunted to ground at the output of said first head rather than being amplified and emitted by a speaker.

9 Claims, 1 Drawing Figure

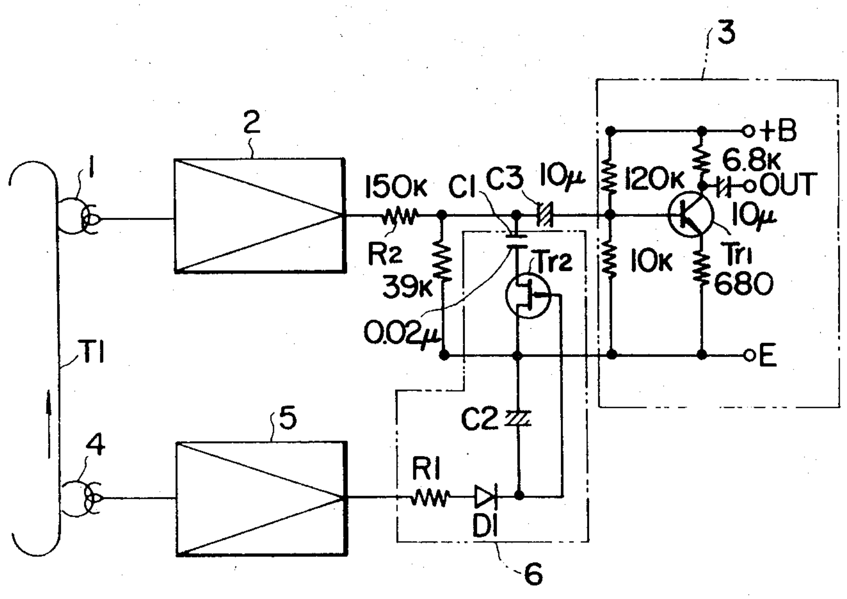
3
2
1
150K
C1
C3
10μ
120K
6.8K
+B
OUT
10μ
R2
39K
0.02μ
Tr2
10K
Tr1
680
E
T1
5
4
C2
R1
D1
6

NOISE REDUCTION DEVICE OF A TAPE RECORDER

BACKGROUND OF THE INVENTION

1. Field of the Invention

This invention relates to a tape recorder and more particularly to a noise reduction method and device for a tape recorder which reduces noise existing in the high frequency range of a reproduced signal.

2. Discussion of the Prior Art

In the prior art, two methods have been proposed to reduce noise existing in the high frequency range of a reproduced signal. In the first method, a signal to be recorded is processed and then recorded. During reproduction, the recorded signal is symmetrically processed so as to obtain the original signal. In the second method, a signal to be recorded is recorded without any processing, and during reproduction, the recorded signal is processed.

The pre-emphasis and de-emphasis method is the first method, wherein the higher the frequency of a signal to be recorded, the more it is emphasized and the higher the frequency of the recorded signal, the more it is de-emphasized. Also, the Dolby system can be used in the first method, wherein a low level signal is emphasized during recording and only the emphasized signal is de-emphasized during reproduction.

A level shifting method is the second method, wherein a part of a reproduced signal is added into a level detecting circuit and a variable impedance circuit, which is connected between a signal line and ground, is varied. Its impedance value is varied with the output level of the level detecting circuit, thus reproducing the signal without decrease if the level of the signal is high enough, and decreasing the high frequency range of the reproduced signal if the level of the signal is low.

However, in the first method, if both recording and reproducing processing characteristics are not completely symmetrical, Hi-Fi reproduction cannot be obtained. And in the second method, when the level of the reproduced signal is continuously low, a transient high level signal cannot pass because it is very difficult to quickly shift the level of the level shifting circuit.

SUMMARY OF THE INVENTION

The object of this invention is to improve the faults in the prior art.

The primary object of this invention is to provide a noise reduction device for a tape recorder wherein a noise existing in the high frequency range can be reduced at reproduction with no relation to recording.

Another object of this invention is to provide a noise reduction device for a tape recorder wherein a transient high level signal can be passed and the level of the reproduced signal is not unnaturally shifted.

BRIEF DESCRIPTION OF THE DRAWING

The FIGURE is a schematic diagram of the preferred embodiment of the present invention.

DESCRIPTION OF THE PREFERRED EMBODIMENT

In the drawing, T1 is a magnetic tape and 1 is a reproducing head. 2 is an amplfier whereby the reproduced signal of the reproducing head ! is amplified. 3 is an amplifier which comprises a transistor Tr1 to amplify the output signal of the amplifier 2 and to drive a speaker.

4 is an erasing head to erase the recorded signal recorded on the magnetic tape T1; the erasing head 4 also reproduces the recorded signal on the magnetic tape during reproduction. 5 is an amplifier for amplifying the reproduced signal of the erasing head 4, and 6 is a by-pass circuit comprising a transistor Tr2, condensers C1 and C2, a resistor R1, and a diode D1. C3 and R2 are a coupling condenser and a resistor which are connected between amplifiers 2 and 3.

Now, the operation of this device will be explained. The reproducing head 1 has good frequency characteristics and reproduces the tape T1. The reproduced signal is amplified by amplifiers 2 and 3 and emitted by a speaker (not shown).

In this reproduction operation, the erasing head 4 is coupled with the magnetic tape T1 and reproduces in a frequency range between 300–3,000 Hz wherein almost all signals of music and conversation are contained. Therefore, when the reproduced signal of the erasing head 4 is above a certain level, the reproduced signal of the reproducing head 1 can be heard through the amplifiers 2 and 3 without any jarring noise.

In this case, when the level of the reproduced signal is greater than the certain level, the output signal of the amplifier 5 is rectified by the diode D1 and charges the integrating condenser C2. The field effect transistor Tr2 of the by-pass circuit 6 becomes a high impedance because of the charged voltage. Thus, the output signal of the amplifier 2 is heard with good frequency characteristics without being shunted by the by-pass circuit 6.

When the level of recorded signal is low, the level of the reproduced signal of the reproducing head 1 becomes low, and the reproduced signal of the erasing head 4 is low also.

Higher frequency range signals, i.e. above 3,000 Hz, wherein many noises are contained are amplified by the amplifiers 2 and 3. But, as the level of the output signal of the erasing head 4 is also low, the output level of the amplifier 5 is low, and thus the field effect transistor Tr2 of the by-pass circuit 6 has a low impedance. Consequently, higher frequency range signals of the output of amplifier 2 are shunted to the ground by the condenser C1 and the field effect transistor Tr2. Thus, the output of the amplifier 2 is decreased in higher frequency range and noise in the higher range is reduced. However, almost all of reproduced signal in the range less than 3,000 Hz is reproduced without shunting.

According to this device, as hereinbefore described, the erasing head is used in the reproducing operation to make use of its frequency characteristic and to reduce the higher frequency range which contains little or no music or voice, when the reproduced signal becomes low level. Therefore, the signal to noise ratio of reproduced signal can be improved.

In this embodiment, the erasing head is used but another head having similar characteristics may be provided and used.

While the invention has been particularly shown and described with reference to the preferred embodiment thereof, it will be understood by those skilled in the art that various changes in form and details may be made therein without departing from the spirit and scope of the invention.

I claim:

1. A noise reduction device for a magnetic tape recorder, said device comprising:

a. first magnetic head means for reproducing a signal recorded on a tape;

b. amplifier means for amplifying said reproduced signal;

c. second magnetic head means for reproducing only a first portion of said signal recorded on the tape, wherein said portion lies in a predetermined frequency range and wherein said second magnetic head means is positioned to reproduce said signal prior to said first magnetic head means;

d. bypass circuit means coupled between said first magnetic head means and said amplifier means for controllably shunting to ground a second signal portion, above said predetermined frequency range, reproduced by said first magnetic head means in inverse proportion to the output level of said second magnetic head means; and e. means coupling said second magnetic head means and said bypass circuit means for applying the output of said second magnetic head means to said bypass circuit means; wherein said bypass circuit means is controlled by the output level of said second magnetic head means such that said second reproduced signal portion is shunted only when the output level of said second magnetic head means is below a certain level, whereby noise signals reproduced by said first magnetic head means and above said predetermined frequency range are shunted in proportion to the output level of the second magnetic head means by said bypass circuit means and not applied to said amplifier means.

2. A noise reduction device as set forth in claim 1 wherein said bypass circuit means comprises: an integrating circuit for integrating the output of said second magnetic head means, and a variable impedance circuit responsive to the output of said integrating circuit and having a high impedance when the signal reproduced by said first magnetic head means lies within said frequency range and having a low impedance when said reproduced signal lies above said frequency range.

3. A noise reduction device as set forth in claim 2 wherein said variable impedance device includes a field effect transistor.

4. A noise reduction device as set forth in claim 3 wherein said variable impedance circuit further includes a condenser coupled between said second magnetic head means and said field effect transistor wherein a signal reproduced by said second magnetic head means charges said condenser thus causing said field effect transistor to assume a high impedance state.

5. A noise reduction device as set forth in claim 1 wherein said first and second magnetic head means each comprises a reproducing head and an amplifier.

6. A noise reduction device as set forth in claim 5 wherein said reproducing head of said second magnetic head means is an erasing head.

7. A noise reduction device as set forth in claim 1 wherein said frequency range is approximately 300 to 3,000 Hz.

8. A method of reducing noise in a magnetic tape recorder comprising the steps of:

a. reproducing a signal recorded on a magnetic tape using a first magnetic head means;

b. reproducing, prior to the first reproducing step, only a portion of the signal recorded on said magnetic tape using a second magnetic head means, said portion including signal frequencies within a predetermined frequency range;

c. shunting to ground the frequency components of said signal reproduced by the first magnetic head means, which are above said predetermined frequency range, when the level of the signal portion reproduced by said second magnetic head means is below a certain level, whereby noise above said predetermined frequency range is shunted to ground; and d. amplifying the entire frequency range of said signal reproduced by said first magnetic head means when the output level of said second magnetic head means is above said certain level.

9. The method as set forth in claim 8 wherein said predetermined frequency range is approximately from 300 to 3,000 Hz.

* * * * *